(12) United States Patent
Geeraerts

(10) Patent No.: US 9,251,702 B2
(45) Date of Patent: Feb. 2, 2016

(54) REMOTE CONTROL OF A PLURALITY OF DEVICES

(75) Inventor: Sam Geeraerts, Louvain (BE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 856 days.

(21) Appl. No.: 13/392,539

(22) PCT Filed: Aug. 19, 2010

(86) PCT No.: PCT/IB2010/053747
§ 371 (c)(1),
(2), (4) Date: Mar. 29, 2012

(87) PCT Pub. No.: WO2011/024106
PCT Pub. Date: Mar. 3, 2011

(65) Prior Publication Data
US 2012/0185064 A1    Jul. 19, 2012

(30) Foreign Application Priority Data
Aug. 25, 2009 (EP) .................................. 09168589

(51) Int. Cl.
*G06F 19/00* (2011.01)
*G08C 25/02* (2006.01)
*H04Q 9/04* (2006.01)

(52) U.S. Cl.
CPC .............. *G08C 25/02* (2013.01); *H04Q 9/04* (2013.01); *G08C 2201/50* (2013.01)

(58) Field of Classification Search
USPC ......... 700/17, 83, 71; 314/173, 174; 709/208, 709/221, 212; 340/12.25, 12.54; 455/31
See application file for complete search history.

(56) References Cited

U.S. PATENT DOCUMENTS

| 4,703,359 | A | * | 10/1987 | Rumbolt et al. | 348/734 |
| 5,689,353 | A | * | 11/1997 | Darbee et al. | 398/112 |
| 5,769,531 | A | | 6/1998 | Hunt et al. | |
| 6,587,067 | B2 | * | 7/2003 | Darbee et al. | 341/176 |
| 7,449,847 | B2 | | 11/2008 | Schanberger et al. | |
| 7,877,588 | B2 | * | 1/2011 | Gharapetian | 713/1 |
| 8,704,698 | B2 | * | 4/2014 | Park et al. | 341/176 |
| 2002/0108082 | A1 | * | 8/2002 | McDonnell | 714/748 |
| 2002/0143805 | A1 | * | 10/2002 | Hayes et al. | 707/500 |

(Continued)

FOREIGN PATENT DOCUMENTS

| CN | 101218548 A | 7/2008 |
| JP | 08505445 A | 6/1996 |

(Continued)

*Primary Examiner* — Kidest Bahta
(74) *Attorney, Agent, or Firm* — Meenakshy Chakravorty

(57) ABSTRACT

A system and method are described for controlling a plurality of devices (150) by a remote control apparatus (105). The remote control apparatus (105) transmits a same sequence of commands individually to each of the plurality of devices (150) to execute a relative increase or decrease of a parameter thereof with a certain value. There is two-way communication between the remote control apparatus (105) and the devices (150). The devices (150) acknowledge the correct reception of a command by transmitting an acknowledgement message to the remote control apparatus (105). The remote control apparatus (105) repeats the transmission of a command to a device (150) in case of not receiving an acknowledgement message from the device (150). In this way, it is guaranteed that all controlled devices (150) receive the same commands and the controlled parameters thereof are kept in synchronization.

13 Claims, 4 Drawing Sheets

(56) References Cited

U.S. PATENT DOCUMENTS

| | | | |
|---|---|---|---|
| 2004/0266419 A1* | 12/2004 | Arling et al. | 455/420 |
| 2013/0152430 A1* | 6/2013 | Bier et al. | 36/3 A |

FOREIGN PATENT DOCUMENTS

| | | | |
|---|---|---|---|
| JP | 2000358287 A | 12/2000 |
| JP | 2001198533 A | 7/2001 |
| JP | 2002110370 A | 4/2002 |
| JP | 200226087 A | 9/2002 |
| JP | 2002373794 A | 12/2002 |
| JP | 2005346980 A | 12/2005 |
| JP | 2009097267 A | 5/2009 |
| WO | 2005000003 A2 | 1/2005 |
| WO | 2008084414 A1 | 7/2008 |
| WO | 2008139360 A1 | 11/2008 |

* cited by examiner

REMOTE CONTROL OF A PLURALITY OF DEVICES

BACKGROUND OF THE INVENTION

The present invention relates to the field of remote control and more specifically to the remote control of parameters over a range.

DESCRIPTION OF RELATED ART

Many control applications are moving from fixed state control (on/off) to value based level control, providing continuous control of parameters having a significant range such as light intensity (dimming), color, volume, etc. Conventional one-way control systems use mostly fixed step relative control, i.e. they transmit commands to a controlled device instructing it to increase or decrease the value of a parameter with a fixed step. However, such fixed step control offers no control of the synchronization of multiple devices that are simultaneously controlled. The synchronization may for example be lost if one of the devices does not correctly receive one or more of the control commands, e.g. in case of bad transmission conditions, while the others do. If this happens, the multiple controlled devices only get back into synchronization when the minimum or maximum values of the parameters are reached.

In order to overcome this drawback other control systems use absolute value control, i.e. the controlled devices are immediately provided with the expected end point of the parameter of the control operation. However, absolute control renders it difficult for example to dim a scene of multiple lighting arrangements, since they either must be all at the same level, which is uncommon for scenes, or each arrangement must be individually polled for the old value of the parameter and a command must based on the old value. This requires the use of a wide bandwidth low latency network for transmitting the commands and the remote control apparatus must understand the parameter range of the controlled device.

SUMMARY OF THE INVENTION

It would be advantageous to provide a system and method enabling synchronized relative value control of a plurality of devices.

To better address this concern, according to an aspect of the invention a system is provided comprising a remote control apparatus for controlling a plurality of devices, the remote control apparatus comprising:

a transmitter for transmitting a same sequence of commands individually to each of the plurality of devices, each of the commands of the sequence instructing the respective device to execute a relative increase or decrease of a parameter thereof with a certain value and a controller for generating the commands and controlling the transmission of the sequence of commands, the controller controlling the transmitter to repeat the transmission of a command to a device in case of not receiving an acknowledgement message from the device.

The system furthermore comprises a plurality of devices controlled by a remote control apparatus, each of the devices comprising:

a receiver for receiving a sequence of commands from the remote control apparatus instructing the device to execute a relative increase or decrease of a parameter thereof with a certain value, a transmitter and a controller for controlling the execution of the relative increase or decrease of the parameter, according to the value of each of the commands of the sequence and generating an acknowledgement message to be transmitted by the transmitter in case of correctly receiving a command.

As a result of the point-to-point two-way communication between the remote control apparatus and the devices, all addressed devices are kept in synchronization without the need for the remote control apparatus to have information on the current value of the controlled parameter of the devices. The system according to the invention may be advantageously applied for home automation where synchronization between controlled devices is an issue, for example for dimming light scenes, curtain or sun blind control, etc. Relative control of a parameter offers "abstraction" between the remote control apparatus and the controlled devices, i.e. the remote control apparatus does not need have information on the parameter that it controls. As a result, the system according to the invention is easily expandable to new types of controlled devices without the need to adapt the remote control apparatus.

Furthermore, the requirements regarding the bandwidth and latency of the transmission medium used for transmitting the commands from the remote control apparatus to the plurality of controlled devices are not as high as for the case of absolute value control with individual polling, enabling the use of a wireless transmission medium for transmitting the commands.

According to an embodiment of the invention, the controller of the remote control apparatus controls the transmitter to transmit a command of the sequence to each of the plurality of devices before starting the transmission of a next command of the sequence. In case of not receiving an acknowledgement from one or more of the devices after transmission of the command, the command is transmitted first to all devices to which the command has not been transmitted yet and thereafter the transmission of the command to the one or more devices, of which no acknowledgement has been received, is repeated. As a result, the latency of the transmission of the command to the devices, from which an acknowledgment is received, is minimized.

According to a further embodiment of the invention, the controller of the remote control apparatus controls a value of the increase or decrease instructed by the commands as a function of the time period needed to transmit one or more commands of the sequence of commands to each of the plurality of devices. This time period depends on the conditions of the transmission medium used for transmission of the commands. In case of bad transmission conditions, repeated transmission of commands occurs more often, so the time needed to transmit the one or more commands to each of the plurality of devices will be longer. It is furthermore dependent on the amount of devices that is controlled.

The value of the relative increase or decrease may be proportional to the time period. So, if the time period is long, the value of the relative increase or decrease is high and if the time period is short, the value of the relative increase or decrease is low. As a result, the value of the controlled parameter increases or decreases as a function of time approximately according to a predefined slope, independently of the time period needed to transmit the one or more commands to each of the plurality of devices. Therefore, the control is relatively insensitive to fluctuations in the conditions of the transmission medium used for transmission of the commands as well as to the amount of devices, which is controlled.

In case of an initial command, there are no measurements available yet of the time period that is needed to transmit a command to all controlled devices. Therefore, the controller controls the value of the relative increase or decrease instructed by the command based on conditions of a transmission medium (either statistical or measured current transmission conditions) over which the command will be transmitted and based on the amount of devices to which the command will be transmitted.

In case of commands subsequent to the initial command the controller preferably controls the value of the relative increase or decrease based on a monitored time period needed to transmit one or more previous commands to the plurality of devices.

According to a further embodiment, in case of a final command the controller sets the relative increase or decrease to a predetermined value, for example zero. In this way, the controlled devices know that the control operation has come to an end and that for the time being no further commands will be transmitted by the remote control apparatus.

According to a still further embodiment, the commands are transmitted as long as this is requested by a user, for example by pressing a button. This results in a natural way of control by the user.

If the value of the relative increase or decrease according to the command is larger than a threshold value, the controller of the controlled devices may smooth the relative increase or decrease. Hereby, larger value jumps are masked to the user.

According to a still further embodiment, the controller of the controlled devices controls the execution of the relative increase or decrease according to the value of each of the commands of the sequence and a scaling factor. This enables the use of a single remote control apparatus for the control of parameters having different value ranges (e.g. a light scene and a sun blind).

According to a further aspect of the invention method is provided for controlling a plurality of devices by a remote control apparatus comprising the following steps performed by the remote control apparatus:

causing transmission of a same sequence of commands individually to each of the plurality of devices, each of the commands of the sequence instructing the respective device to execute a relative increase or decrease of a parameter thereof with a certain value and repeating the transmission of a command to a device in case of not receiving an acknowledgement message from the device.

According to an embodiment, the method comprises the following steps performed by one of the plurality of devices:

receiving the sequence of commands from the remote control apparatus instructing the device to execute a relative increase or decrease of a parameter thereof with a certain value, controlling the execution of the relative increase or decrease of the parameter, according to the value of each of the commands of the sequence and transmitting an acknowledgement message in case of correctly receiving a command.

Preferably, the method according to the invention is implemented by means of a computer program.

The computer program may be embodied on a computer readable medium or a carrier medium may carry the computer program.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

Figure 1:
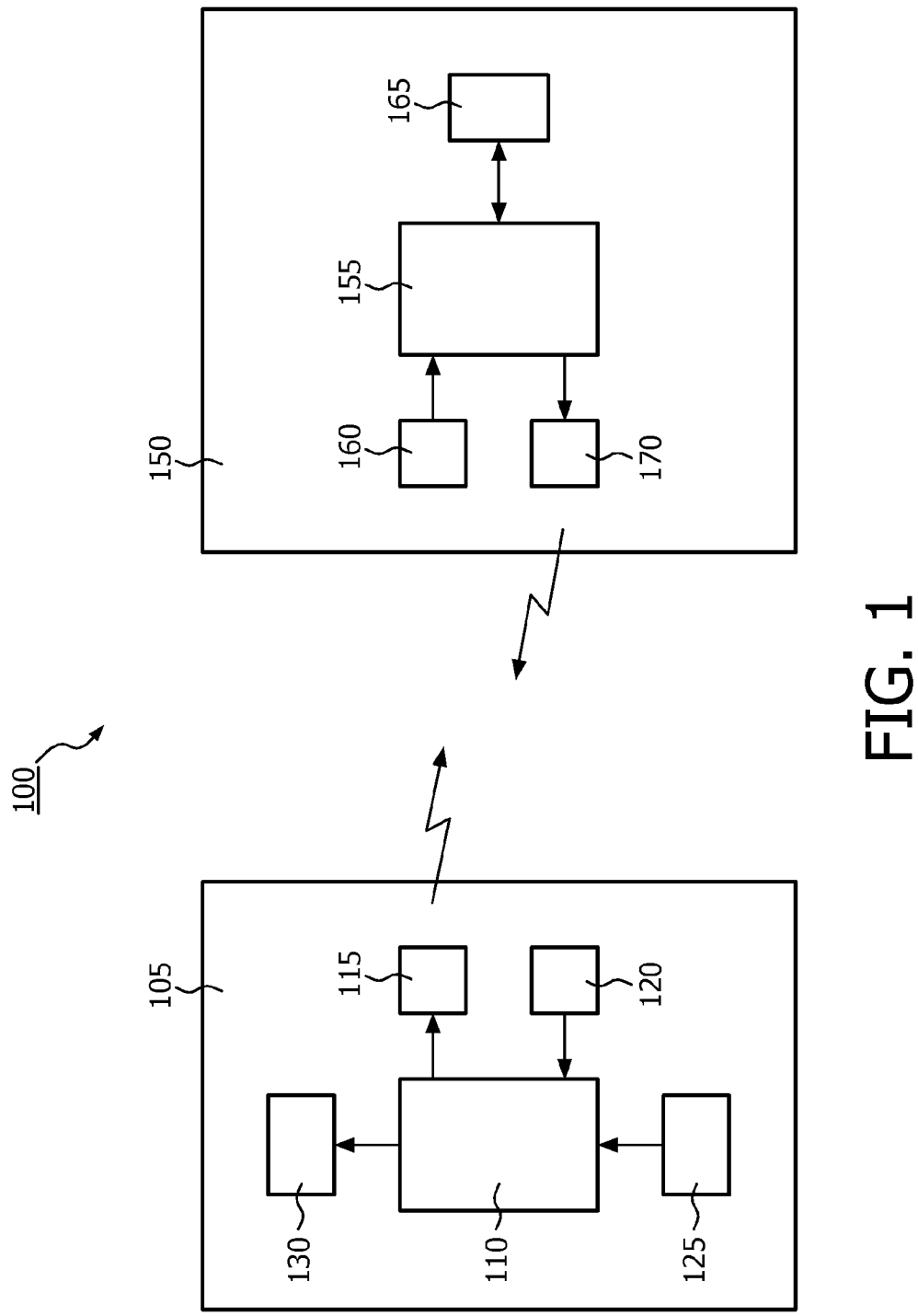
FIG. 1 shows a block diagram of a remote control system according to an exemplary embodiment of the present invention.

FIG. 1 shows a block diagram of the system 100 according to an exemplary embodiment of the invention. The system comprises a remote control apparatus 105, which comprises a controller 110, preferably a processor with associated memory loaded with a suitable computer program, a wireless transmitter 115, a wireless receiver 120, user input means 125, such as keys, and user output means 130, which may be LEDs or a display. The system furthermore comprises a plurality of controlled devices 150, which are further referred to in this description as actuators, of which only one is shown. The actuators 150 each comprise a controller 155, preferably a processor with associated memory loaded with a suitable computer program, a wireless receiver 160, means 165 for executing the adjustment of a parameter and a wireless transmitter 170. The means 165 comprise for example circuitry for dimming a lighting arrangement, an engine for moving a curtain or sun blinds, etc.

The wireless transmitters and wireless receivers of the remote control apparatus and the actuators communicate bi-directionally over a wireless link, for example in the 868 MHz band.

Figure 2:
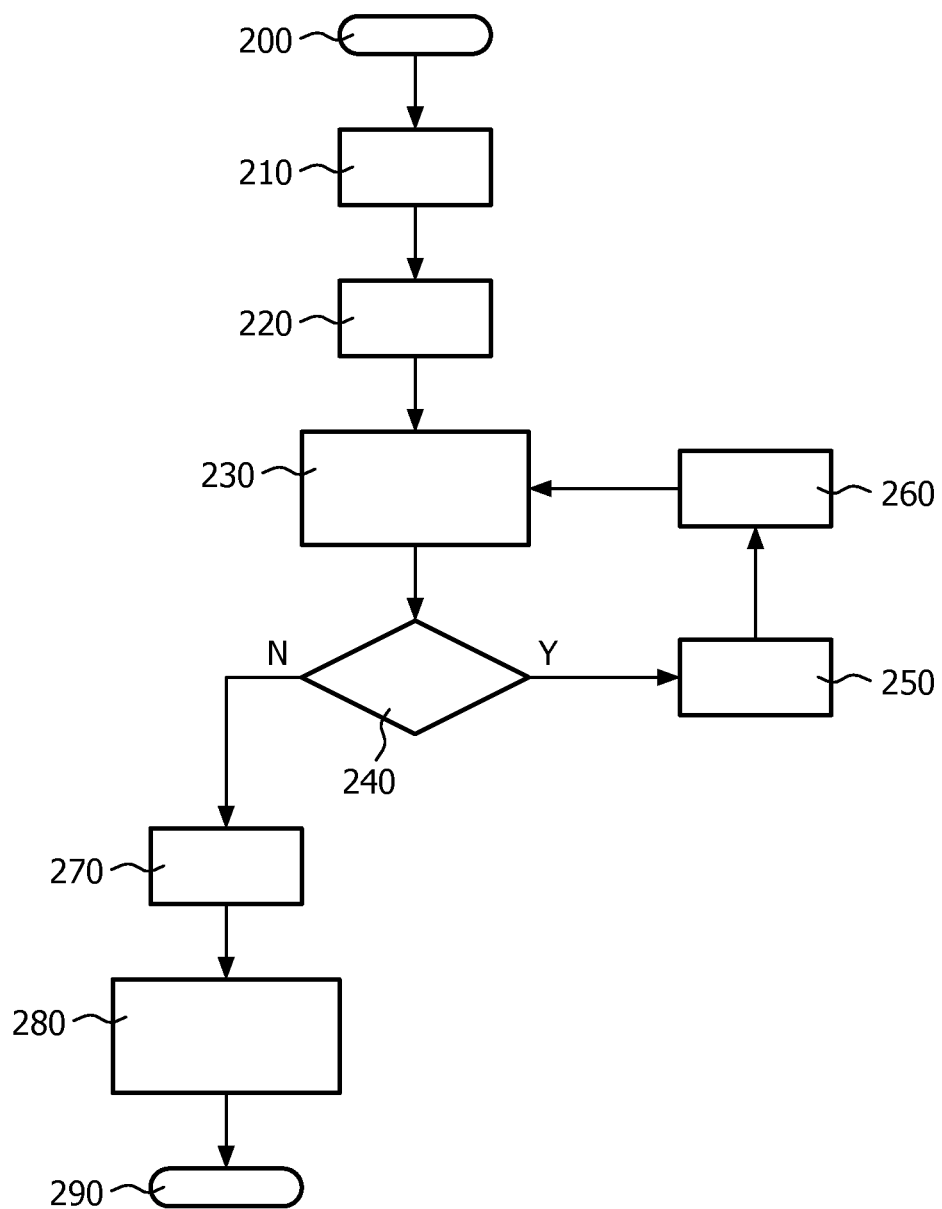
FIG. 2 shows a flowchart according to an exemplary embodiment of the invention of the steps for setting a value of a parameter increase or decrease of a command.

FIG. 2 shows an exemplary way to determine the value of the increase or decrease of a parameter. The value is inserted in a command that is transmitted to each of the controlled actuators. Upon occurrence of a user parameter control event, e.g. a button press by the user (step 200), the expected time period is estimated to transmit a command to each of the controlled actuators, including possible repetitions (step 210). Since there are no measurements available of the time period needed to transmit previous commands to all actuators, the time period is predicted based on the amount of actuators to communicate to and/or the last known conditions of transmission to these actuators. Based on the predicted time period, the initial value of increase or decrease (step size) is calculated (step 220). A command with this value is transmitted to all controlled actuators (step 230).

Figure 3:
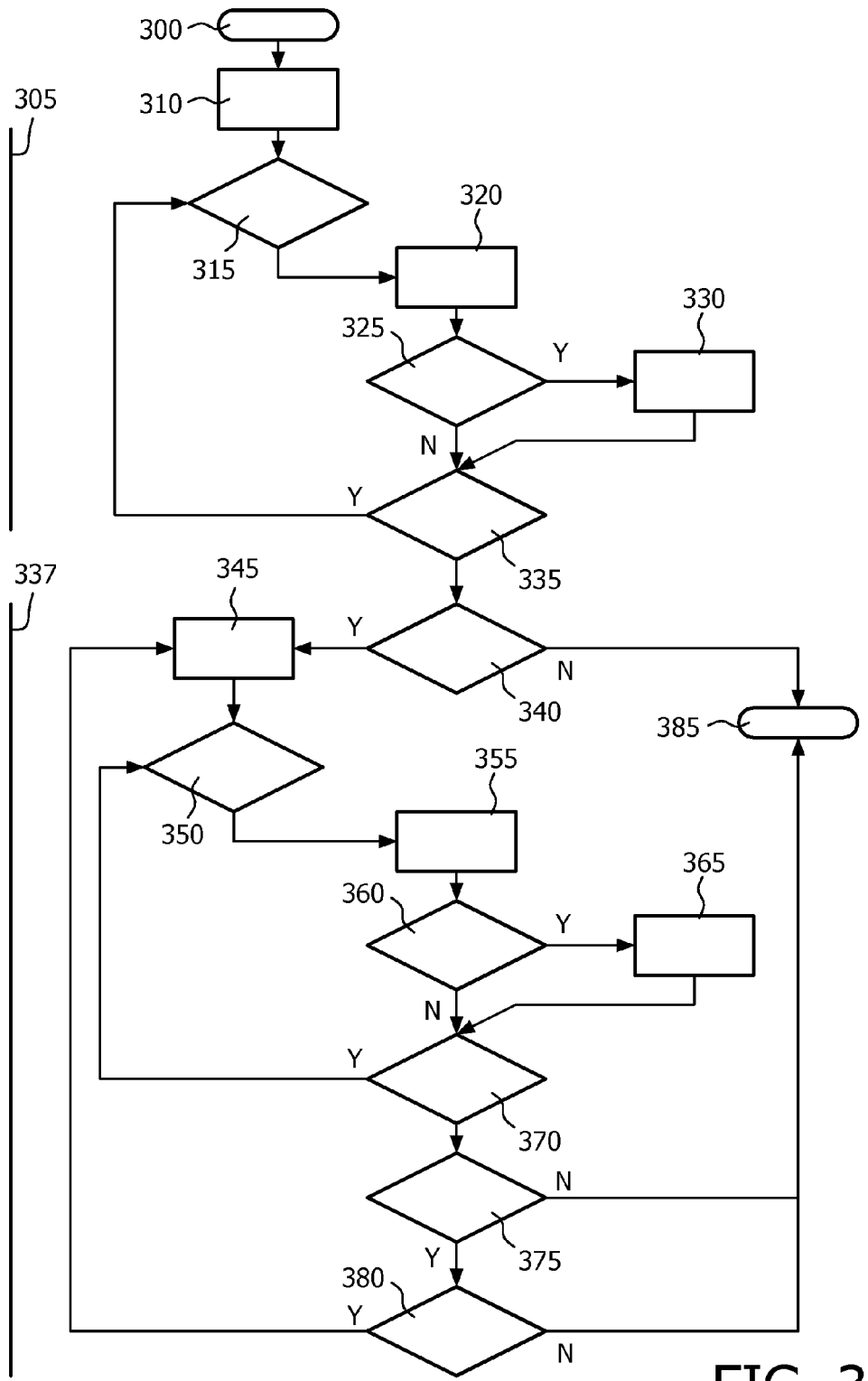
FIG. 3 shows a flowchart according to an exemplary embodiment of the invention of the steps for transmitting a command from the remote control apparatus to the controlled devices.

The transmission of a single command to all addressed actuators is shown in detail in FIG. 3. Upon occurrence of the user parameter control event (step 300) an initial transmission sequence is executed (stage 305). First, a retry counter is cleared (step 310). After assessing if the transmission medium is free (step 310), a command is transmitted to a first actuator in the list of actuators (step 320). It is checked if the command is acknowledged by the actuator (step 325). If this is not the case, it is determined if there are any actuators left in the list of addressed actuators, whereto the command has not been transmitted, yet (step 335). If the command is acknowledged, the command transmission for the actuator is marked as acknowledged (step 330) and the flow jumps to step 335. If there are any actuators left in the list of addressed actuators, whereto the command has not been transmitted, yet the next actuator in the list is selected and steps 315, 320, 325, 330 and 335 are repeated. This continues until a command has been transmitted to all actuators in the list.

Now, a repeat transmission sequence is started (stage 337). First it is checked if there are any actuators in the list that have not been marked as acknowledged (step 340). If this not the case the control flow is ended (step 385). If there are actuators left that have not been marked as acknowledged, the retry counter is incremented (step 345). After assessing if the transmission medium is free (step 350), a command is retransmitted to the first actuator in the list of actuators not marked as acknowledged (step 355). It is checked if the command is acknowledged by the actuator (step 360). If this is not the case, it is determined if there are any actuators not marked as acknowledged left in the list of addressed actuators, whereto the command has not been transmitted, yet (step 370). If the command is acknowledged, the command transmission for the actuator is marked as acknowledged (step 365) and the flow jumps to step 370. If there are any actuators not marked as acknowledged left in the list of addressed actuators, whereto the command has not been retransmitted, yet the next actuator marked as acknowledged in the list is selected and steps 350, 355, 360, 365 and 370 are repeated. This continues until the command has been retransmitted to all actuators not marked as acknowledged in the list.

Then it is determined if there are still any actuators left that have not been marked as acknowledged (step 375). If this is not the case the control flow is ended (step 385). If there are actuators left that have not been marked as acknowledged, it is determined if the value of the retry counter smaller than a maximum number of retries (step 380). If this is the case the flow loops back to step 345. If a maximum number of retries has been reached, the flow is aborted with errors (step 385).

Now referring again to FIG. 2, after completion of the transmission of the initial command to all addressed actuators (step 230), it is determined if the parameter adjustment of the actuators initiated by the user should continue (step 240). If this is the case, for example because the user continues pressing the button, the actual time is compared to the predicted time calculated in step 210 (step 250). Based thereon and based on the target slope of the controlled parameter (explained in more detail with reference to FIG. 4), the value (step size) to be inserted in the next command is calculated (step 260). In case that the actual time is larger than the predicted time, the step size is increased. In case that the actual time is smaller than the predicted time, the step size is decreased. The next command is transmitted to all controlled actuators (step 230).

Alternative ways of determining the step size of the next command, using the predicted time directly for the calculations and not the difference between the actual time and the predicted time, readily occur to the skilled person.

If the parameter adjustment of the actuators initiated by the user should not continue, for example because the user has stopped pressing the button, the final step size is set for control termination (step 270). This step size has a predetermined value, for example zero, so that the actuators know that there will not be any further commands for this control operation. A command with this step size is transmitted to all controlled actuators (step 280).

The functionality shown in FIGS. 2 and 3 is preferably implemented by a means of a suitable computer program loaded to the associated memory of the processor 110.

Upon receiving a command with a certain step size from the remote control apparatus 105, the processor 155 of each actuator generates an acknowledgement message that is transmitted back to the remote control apparatus by transmitter 170. Furthermore, the processor controls the means 165 such that the adjustment of the controlled parameter is executed according to the step size of the command.

Figure 4:
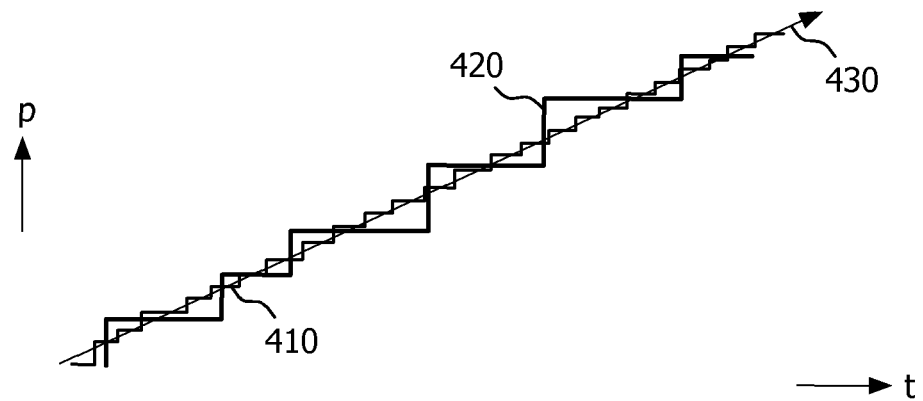
FIG. 4 shows the value of a controlled parameter as a function of time according to an exemplary embodiment of the invention for two different situations.

The adjustment speed of the controlled parameter of the actuators may be normalized, as shown in FIG. 4 depicting the value P of the controlled parameter as function of time t. For a limited amount of controlled actuators and good transmission conditions, the time period needed to transmit a command to all controlled actuators including possible repeated transmissions is relatively short. This results in many adjustments with small steps (curve 410). With larger groups of controlled actuators and/or bad transmission conditions (which causes many repeated transmissions) the time period needed to transmit a command to all controlled actuators is relatively large. This results in fewer adjustments with coarser steps (curve 420). However, both curves 410,420 approximately follow the coarse of slope 430 representing the normalized adjustment speed of the parameter. So, the adjustment speed remains more or less fixed, except under extreme conditions.

The step size is equal to the time period needed to transmit a command to all controlled actuators multiplied by the normalized adjustment speed.

All controlled actuators receive the same commands. This keeps them synchronized in output, even in case of different transmission conditions for different actuators. For example, for sun blinds or dimmers this synchronous behavior is important.

Since, the upper and lower limit of the range of a controlled parameter are known, scaling can be applied to get the desired total transition time from the lower limit to the upper limit. Take the example of a light dimmer with range 0x20 to 0xFF. It has a total range of 224 units. In case of a normalized speed of 50 units/second the transition time over the full range of the actuator without scaling would be approximately 4.5 seconds. However, by applying scaling in the actuator any transition time and any desired range can be selected of whatever appliance the actuator is controlling (e.g. light dimmers, curtain controls, etc).

Figure 5:
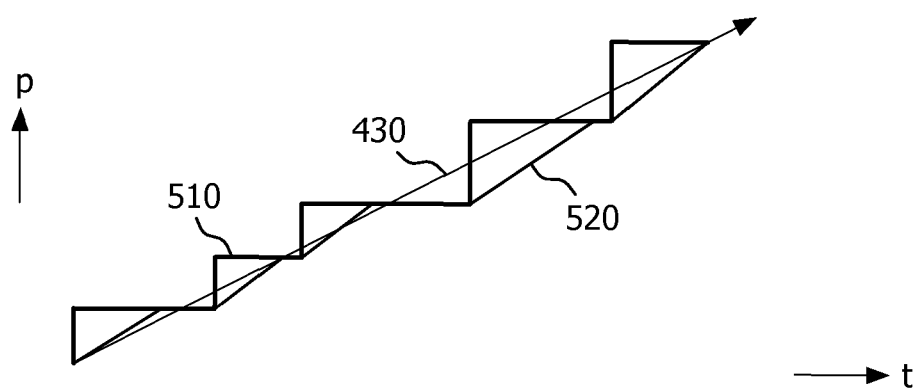
FIG. 5 shows the value of a controlled parameter as a function of time according to an alternative exemplary embodiment of the invention.

For actuators designed to operate in large groups, such as light dimmers, step sizes can become large and clearly visible to the user. This problem can be partly solved by smoothing to soften significant large step sizes (larger than a predetermined threshold value) using a ramping speed equal to or faster than the normalized adjustment speed 430. The effect of smoothening is shown in FIG. 5, with curve 510 corresponding to the parameter adjustment without smoothening and curve 520 corresponding to parameter adjustment with smoothening.

Smoothening may still result in periodic halts in the adjustment of the controlled parameter, but it masks larger value jumps to the user.

Under extreme conditions, such as a very large amount of actuators and/or very poor transmission conditions, it is possible that the step size becomes unacceptable big. Therefore, it is preferable to limit the maximum step size to a certain value, for example to the value corresponding to a time period of 0.5 s for transmitting a single command to all controlled actuators.

Controlling the same actuator value simultaneously by two controllers may result in either double speed of control in case that the value is adjusted in the same direction by both controllers, or approximate cancellation of the control streams if the controllers adjust the value in opposite directions. For applications where such behavior is not acceptable, precautions should be taken to avoid this. For example, the commands transmitted by the controllers may be provided with an identifier field and an actuator may be configured, after initiation of a control operation by a certain remote control apparatus to ignore commands from other remote control apparatuses until the control operation is finished.

The functionality of the actuator described herein above is preferably implemented by a means of a suitable computer program loaded to the associated memory of the processor 155.

While the invention has been illustrated and described in detail in the drawings and foregoing description, such illustration and description are to be considered illustrative or exemplary and not restrictive; the invention is not limited to the disclosed embodiments.

In this regard it is to be noted that any suitable transmission medium may be used for the communication between the remote control apparatus and the actuators, such as radio links, wireless radio frequency networks, buses, wired networks, etc.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The present invention can be resumed as follows: a system and method for controlling a plurality of devices by a remote control apparatus. The remote control apparatus transmits a same sequence of commands individually to each of the plurality of devices to execute a relative increase or decrease of a parameter thereof with a certain value. In order to keep the different controlled devices in synchronization with each other, there is two-way communication between the remote control apparatus and the devices. The devices acknowledge the correct reception of a command by transmitting an acknowledgement message to the remote control apparatus. The remote control apparatus repeats the transmission of a command to a device in case of not receiving an acknowledgement message from the device. In this way, it is guaranteed that all controlled devices receive the same commands and are kept in synchronization.

The invention claimed is:

1. A remote control apparatus for controlling a plurality of devices, the remote control apparatus comprising:
    a transmitter transmitting a sequence of commands individually to each of the plurality of devices, each of the commands of the sequence instructing the respective device to execute an increase or decrease of a parameter thereof with a certain value; and
    a controller generating the commands and controlling the transmission of the sequence of commands, the controller controlling the transmitter to repeat the transmission of a command to a device in case of not receiving an acknowledgement message from the device, the repeat of the transmission of the command to the device based upon a function of the time period needed to transmit one or more of the commands.

2. The remote control apparatus according to claim 1 wherein the controller controls the transmitter to transmit a command of the sequence to each of the plurality of devices before starting the transmission of a next command of the sequence and, in case of not receiving the acknowledgement from one or more devices after transmission of the command, to transmit the command first to all devices to which the command has not been transmitted yet and thereafter repeat the transmission of the command to the one or more devices from which no acknowledgement has been received.

3. The remote control apparatus according to claim 1 wherein the controller controls a value of the increase or decrease instructed by the commands as a function of the time period needed to transmit one or more commands of the sequence of commands to each of the plurality of devices.

4. The remote control apparatus according to claim 3, wherein the value of the increase or decrease is proportional to the time period.

5. The remote control apparatus according to claim 3, wherein, for an initial command, the controller controls the value of the increase or decrease instructed by the command based on conditions of a transmission medium over which the command will be transmitted and based on the amount of devices to which the command will be transmitted.

6. The remote control apparatus according to claim 3, wherein for commands subsequent to the initial command the controller controls the value of the increase or decrease based on a monitored time period needed to transmit one or more previous commands to the plurality of devices.

7. The remote control apparatus according to claim 1, wherein, for a final command, the controller sets the increase or decrease to a predetermined value.

8. The remote control apparatus according to claim 1, wherein the commands are transmitted as long as this is requested by a user.

9. A system comprising a remote control apparatus according to claim 1 and a plurality of devices controlled by the remote control apparatus, the devices comprising:
    a receiver receiving the sequence of commands from the remote control apparatus instructing the device to execute the increase or decrease of the parameter thereof with the certain value,
    a transmitter; and
    a controller controlling the execution of the increase or decrease of the parameter, according to the value of each of the commands of the sequence and generating the acknowledgement message to be transmitted by the transmitter in case of correctly receiving the command.

10. The system according to claim 9, wherein if the value of the increase or decrease according to the command is larger than a threshold value, the controller smoothes the increase or decrease.

11. The system according to claim 9, wherein the controller controls the execution of the increase or decrease according to the value of each of the commands of the sequence and a scaling factor.

12. A remote control apparatus for controlling a plurality of devices, the remote control apparatus comprising:

a processor having memory with instructions for controlling the transmission of a sequence of commands through a transmitter, the processor configured by the instruction to transmit the sequence of commands individually to each of the plurality of devices;

each of the commands of the sequence instructing the respective device to execute an increase or decrease of a parameter for the respective device by a certain value;

the processor configured by the instruction to generate the commands and control the transmission of the sequence of commands, the processor controlling the transmitter to repeat the transmission of a command to a device in case of not receiving an acknowledgement message from the device, the increase or decrease of the parameter for the respective device modified as a function of the time period needed to transmit one or more commands of the sequence of commands.

13. A remote control apparatus for controlling a plurality of devices, the remote control apparatus comprising:

a processor having memory with instructions for controlling the transmission of a sequence of commands through a transmitter, the processor configured by the instruction to transmit the sequence of commands individually to each of the plurality of devices;

each of the commands of the sequence instructing the respective device to execute an increase or decrease of a parameter for the respective device by a certain value;

the processor configured by the instruction to generate the commands and control the transmission of the sequence of commands;

wherein the processor controls a value in the memory of the increase or decrease instructed by the commands as a function of the time period needed to transmit one or more commands of the sequence of commands to each of the plurality of devices.

\* \* \* \* \*